(12) United States Patent
Singhal et al.

(10) Patent No.: US 8,795,409 B2
(45) Date of Patent: Aug. 5, 2014

(54) AIR SEPARATION PLANT CONTROL

(75) Inventors: Ashish Singhal, Getzville, NY (US);
Stephane Blouin, Halifax (CA)

(73) Assignee: Praxair Technology, Inc., Danbury, CT (US)

( * ) Notice: Subject to any disclaimer, the term of this patent is extended or adjusted under 35 U.S.C. 154(b) by 412 days.

(21) Appl. No.: 13/217,898

(22) Filed: Aug. 25, 2011

(65) Prior Publication Data

US 2013/0053998 A1 Feb. 28, 2013

(51) Int. Cl.
*F25J 3/04* (2006.01)
*G05B 15/02* (2006.01)
*G05B 13/04* (2006.01)

(52) U.S. Cl.
CPC ........... *G05B 13/048* (2013.01); *F25J 3/04678* (2013.01); *F25J 3/04303* (2013.01); *F25J 2290/10* (2013.01); *F25J 3/04412* (2013.01); *F25J 3/04848* (2013.01)
USPC .............. 95/1; 95/23; 95/25; 96/244; 96/252; 96/255; 700/273

(58) Field of Classification Search
CPC combination set(s) only.
See application file for complete search history.

(56) References Cited

U.S. PATENT DOCUMENTS

| | | |
|---|---|---|
| 4,784,677 A | 11/1988 | Al-Chalabi |
| 5,313,800 A | 5/1994 | Howard et al. |
| 7,204,101 B2 | 4/2007 | Seiver et al. |
| 2005/0072187 A1* | 4/2005 | Seiver et al. ................. 62/643 |

OTHER PUBLICATIONS

A Survey of Industrial Model Predictive Control Technology, S. Joe Qin, Thomas A. Badgwell, Aug. 31, 2002, Control Engineering Practice, 11, 733-764.*
Development of Soft Sensor System Via Dynamic Optimization, Xuemie Zhu, Shuqing Wang, 2004.*
J. Miller, W. L. Luyben, P. Belanger, S. Blouin, and L. Megan; "Improving Agility of Cryogenic Air Separation Plants"; Ind. Eng. Chem. Res. 2008, 47, 394-404.
W. K. Lee and K. E. Kim; "An Experimental Application of the Inferential Control Scheme to the Binary Distillation Column Control"; Korean Journal of Chemical Engineering, Springer, vol. 1, No. 1, Mar. 1984, pp. 27-33.
V. Singh, I. Gupta, and H. O. Gupta; "ANN based estimator for distillation-inferential control"; Chemical Engineering and Processing, Elsevier, 2005, vol. 44, No. 7, pp. 785-795.

(Continued)

*Primary Examiner* — Duane Smith
*Assistant Examiner* — Cabrena Holecek
(74) *Attorney, Agent, or Firm* — David M. Rosenblum

(57) ABSTRACT

A method of controlling an air separation plant and a control system to optimize production of an argon product produced by the plant. A computer program is continually executed that has models of each column of the plant, a condenser reboiler and an argon reflux condenser. The models contain stage models of each stage of separation within each of the columns that when assembled are able to calculate current values of controlled variables in response to input variables applied to the models. The controlled variables serve as an input to a controller that controls manipulated variables comprising flow rates of an air feed stream to the air separation plant, a product oxygen stream removed from the lower pressure column and the crude argon feed stream such that the controlled variables are within a targeted range selected to optimize the production of the argon product.

8 Claims, 3 Drawing Sheets

(56) References Cited

OTHER PUBLICATIONS

M. H. Ahmed and J. Zhang; "Multivariable Inferential Feedback Control of Distillation Compositions Using Dynamic Principal Component Regression Models"; American Control Conference, 2003, Proceedings of the 2003, vol. 3, Issue, Jun. 4-6, 2003, pp. 1974-1979.

J. Shin, M. Lee, and S. Park; "Design of a Composition Estimator for Inferential Control of Distillation Columns"; Chemical Engineering Communications, vol. 178, Issue 1, Mar. 2000, pp. 221-248.

J. J. Macias-Hernandez, P. Angelov, and X. Zhou; "Soft Sensor for predicting Crude Oil Distillation Side Streams using Evolving Takagi-Sugeno Fuzzy Models. Results outlined."; Conference, Oct. 7-10, 2007, Montreal, Canada.

X. Zhu and S. Wang; "Development of Soft Sensor System via Dynamic Optimization"; Industrial Electronics Society, 2004. IECON 2004. $30^{th}$ Annual conference of IEEE, Nov. 2-6, 2004, vol. 3, pp. 2104-2109.

Y. Z. Friedman; "Simulation Based Inferential Control"; AIChE Spring Meeting; 1995, pp. 1-7.

* cited by examiner

AIR SEPARATION PLANT CONTROL

FIELD OF THE INVENTION

The present invention relates to a method and control system for controlling an air separation plant to maximize production of an argon product. More particularly, the present invention provides such a method and system in which flow rates of the air fed to the distillation columns of the plant, the product oxygen and a crude argon feed stream are controlled such that estimated concentrations of the argon concentration in a waste nitrogen stream and a nitrogen concentration within a crude argon feed stream fed to an argon column are within targeted ranges that will maximize production of the argon product.

BACKGROUND OF THE INVENTION

Argon products are produced by separating the argon from air through the use of cryogenic rectification that is conducted within an air separation plant. The argon produced can be a crude argon product that is generally further processed to remove oxygen and nitrogen or a purified argon product containing very little oxygen.

In an air separation plant that is designed to produce argon, the air is first compressed and then purified of higher boiling contaminants such as water vapor, carbon dioxide, carbon monoxide and hydrocarbons. The resulting compressed and purified air stream is then cooled to a temperature suitable for its rectification within a distillation column system through indirect heat exchange with waste and product streams produced as a result of the rectification of air. This heat exchange is conducted in a heat exchanger, sometimes termed as the main heat exchanger, which can be a collection of heat exchangers having parallel flows of the air being cooled, subdivided between warm and cold ends and on the basis of the pressure of the product streams.

The compressed and purified air after having been cooled to a temperature at or near its dewpoint is then introduced into a higher pressure column thermally linked to a lower pressure column that operates at a higher pressure then the lower pressure column. A crude liquid oxygen column bottoms, sometimes referred to as kettle liquid and a nitrogen-rich vapor column overhead is produced in the higher pressure column. A stream of the crude liquid oxygen is then further refined in the lower pressure column to produce an oxygen-rich liquid column bottoms and a nitrogen-rich vapor column overhead. The oxygen-rich liquid column bottoms is partially vaporized against condensing the nitrogen-rich vapor produced in the higher pressure column to generate reflux for both of the columns. The distillation is conducted in either of the columns through mass transfer contact between descending liquid and ascending vapor phases within trays or packing contained within the columns. As the liquid phase descends within the lower pressure column, up to a point, it becomes richer in argon that has a similar volatility to the oxygen. At a point near which the argon concentration is a maximum, a stream of crude gaseous argon is removed and then introduced into an argon column to separate the argon from the oxygen and produce the argon product. Typically, the argon product is taken as a liquid from part of the reflux to the argon column. As can be appreciated, since argon is a value added product, it is desirable to control the air separation plant so that argon production will be at a maximum.

In U.S. Pat. No. 4,784,677 argon production is controlled by measuring the nitrogen concentration in the crude argon feed stream to the argon column and the oxygen content in the waste nitrogen stream. The flow rate of liquid nitrogen reflux fed to the lower pressure column is regulated on the basis of such measurements to control the nitrogen content in the crude argon feed stream. Decreasing the reflux rate will decrease the nitrogen content and vice-versa. A major purpose of such control is to prevent the nitrogen content in the argon column from being too large and thereby preventing a sufficient temperature difference in the argon condenser to condense reflux to the argon column and form the argon product. At an extreme, the argon column would not operate and will dump its liquid into its sump or back into the low-pressure column. A disadvantage of such a control scheme is that a change in reflux to the lower pressure column will not instantaneously change the nitrogen content in the crude argon feed stream. Moreover, when the reflux rate to the lower pressure column is reduced, the flow rate of the crude argon feed stream will also be reduced with a consequent reduction in argon production.

In U.S. Pat. No. 5,313,800, the nitrogen concentration in the crude argon feed to the argon column is not measured. Rather such concentration is derived by obtaining temperature measurements within the lower pressure column between the crude oxygen feed point and the location at which the crude argon feed is drawn. The derivation is obtained from a mathematical model correlating the temperature measurements with the nitrogen concentration within the crude argon feed stream. From such estimated content, the flow rate to the argon column can be controlled. Specifically, the crude liquid oxygen from the higher pressure column is fed to the argon condenser and is partially vaporized. Vapor and liquid phase streams produced as a result of such vaporization are fed to the lower pressure column. The flow of the vapor phase stream is controlled to in turn control the pressure within the argon condenser and therefore, the feed rate to the argon column in response to the computations of the nitrogen content of the crude argon column feed stream.

U.S. Pat. No. 7,204,101 uses a multivariable controller to maximize argon production. The controller operates to optimize argon recovery by maximizing the argon concentration in the crude argon column feed by decreasing the oxygen concentration in the feed while preventing concentration of the nitrogen from exceeding a controllable maximum. The controller functions by direct measurements of oxygen concentrations in such streams as the gaseous oxygen product, the crude argon column feed, the nitrogen stream produced by the lower pressure column, nitrogen reflux to the lower pressure column and nitrogen concentration in the crude argon feed stream and by controlling flow rates of the amount of air fed into the distillation column system, the gaseous oxygen product flow from the lower pressure column, the liquid nitrogen reflux to the lower pressure column and the flow of the crude argon fed to the argon column.

The problem with this type of control is that once nitrogen is seen at critical concentrations in the argon product, it is often too late to take effective control action to prevent the argon column from shutting down with a loss of argon production. As will be discussed, the present invention incorporates a control methodology that does not depend on any such direct measurements and therefore, allows an improved control of argon production that does not have to be as conservative as prior art control systems and therefore increased production of the argon.

SUMMARY OF THE INVENTION

In one aspect, the present invention provides a method of controlling an air separation plant to optimize production of an argon product. In accordance with this aspect of the present invention, a computer program is continually executed. The computer program is programmed with models of each of the higher pressure column, the lower pressure column, the argon column, a condenser reboiler operatively associated with the higher pressure column and the lower pressure column and an argon reflux condenser connected to the argon column. The models contain stage models of each stage of separation within each of the higher pressure column, the lower pressure column and the argon column and the condenser reboiler and the argon reflux condenser each consist of a single stage model. The stage models are connected to each other by internal vapor and liquid flows between the stage models and the models containing the stage models are connected to each other by external vapor and liquid flows to and from the stage models that are situated at locations of feeds and draws to and from each of the higher pressure column, the lower pressure column and the argon column.

During each execution of the computer program current values of controlled variables are calculated in response to manipulated variables by conducting a dynamic material balance, a vapor-liquid equilibrium calculation and an energy balance calculation for the stage models with the use of the internal and external vapor and liquid flows. The controlled variables comprise either a quantity that is calculated for the stage models within the lower column that is directly referable to a nitrogen concentration within the crude argon feed stream or the nitrogen concentration within the crude argon feed stream. The manipulated variables comprise a set of flow rates of an air feed stream to the air separation plant, a product oxygen stream removed from the lower pressure column and the crude argon feed stream.

The current values of the controlled variables calculated by the models are inputted into a controller and the controller calculates the manipulated variables from the current values of the controlled variables that will result in the controlled variables having concentration values within targeted ranges, preset in the controller, that will maximize argon product yield of the argon product. The manipulated variables are controlled within the air separation plant to have the set of flow rates calculated by the controller.

The models can be configured to calculate oxygen concentrations of process streams and are able to be biased to minimize differences between the oxygen concentrations that are calculated by the models and measurements of the oxygen concentrations within the air separation plant. As a result, the accuracy of the calculation of the current values of the controlled variables can be assured. In such embodiment, the process streams comprise a product oxygen stream and a waste nitrogen stream withdrawn from the lower pressure column, a nitrogen reflux stream fed to the lower pressure column, a crude argon feed stream fed from the lower pressure column to the argon column and the argon product contained in an argon product stream produced by the argon column. During each execution of the computer program the models are biased to minimize the differences between measured and calculated oxygen concentrations of the process streams.

The vapor liquid equibrium calculation calculates equilibrium vapor phase composition within each stage model. After the equilibrium vapor phase composition is calculated, the models are biased by multiplying a vapor phase concentration of oxygen determined from the equilibrium vapor phase composition by a separation adjustment factor to produce an adjusted vapor phase concentration of the oxygen. A nitrogen concentration is also determined from the equibrium vapor phase composition and is used with the adjusted vapor phase concentration of the oxygen to calculate the argon concentration such that a sum of molar fractions of the oxygen, nitrogen and argon within each of the stage models is equal to 1.0. A common separation adjustment factor is used for the stage models located within each column section defined between locations of the feed and draws to and from each of the higher pressure column, the lower column and argon column. The common separation adjustment factor is calculated such that the difference between the measured oxygen concentrations and the calculated oxygen concentrations at the ends of each column section are minimized.

In another aspect, the present invention provides a control system for controlling an air separation plant to optimize production of an argon product. In accordance with this aspect of the present invention, a computer program is provided that is programmed with models of each of the higher pressure column, the lower pressure column, the argon column, a condenser reboiler operatively associated with the higher pressure column and the lower pressure column and an argon reflux condenser connected to the argon column. The models contain stage models of each stage of separation within each of the higher pressure column, the lower pressure column and the argon column and the condenser reboiler and the argon reflux condenser each consist of a single stage model. The stage models connected to each other by internal vapor and liquid flows between the stage models and the models containing the stage models are connected to each other by external vapor and liquid flows to and from the stage models that are situated at locations of feeds and draws to and from each of the higher pressure column, the lower pressure column and the argon column.

The computer program is configured such that during each execution of the computer program, current values of controlled variables are calculated in response to manipulated variables by conducting a dynamic material balance, a vapor-liquid equilibrium calculation and an energy balance calculation for the stage models with the use of the internal and external vapor and liquid flows. The controlled variables comprise a quantity that is calculated for the stage models within the lower pressure column that is directly referable to a nitrogen concentration within the crude argon feed stream or the nitrogen concentration within the crude argon feed stream. The manipulated variables comprise a set of flow rates of an air feed stream to the air separation plant, a product oxygen stream removed from the lower pressure column and the crude argon feed stream.

A controller is provided that has as an input, the current values of the controlled variables calculated by the models. The controller is configured to calculate the manipulated variables from the current values of the controlled variables that will result in the controlled variables having concentration values within targeted ranges, preset in the controller, that will maximize argon product yield of the argon product. A means is provided for controlling the manipulated variables within the air separation plant to have the set of flow rates calculated by the controller.

The computer program can also be designed to be responsive to oxygen concentrations of process streams that are measured within the air separation plant and the models are configured to calculate oxygen concentrations of process streams and are able to be biased to minimize differences between the oxygen concentrations that are calculated by the models and measurements of the oxygen concentrations within the air separation plant. This will assure the accuracy of the calculation of the current values of the controlled variables. The process streams comprise a product oxygen stream and a waste nitrogen stream withdrawn from the lower pressure column, a nitrogen reflux stream fed to the lower pressure column, a crude argon feed stream fed from the lower pressure column to the argon column and the argon product contained in an argon product stream produced by the argon column. The computer program is configured such that during each execution thereof, the models are biased to minimize the differences between the measured and calculated oxygen concentrations of the process streams.

With respect to the biasing of the models, the computer program can be programmed such that the vapor liquid equibrium calculation calculates equilibrium vapor phase composition within each stage model. After the vapor phase equilibrium composition is calculated, the models are biased by multiplying a vapor phase concentration of oxygen determined from the equilibrium vapor phase composition by a separation adjustment factor to produce an adjusted vapor phase concentration of the oxygen and then a nitrogen concentration also determined from the equibrium vapor phase composition is used with the adjusted vapor phase concentration of the oxygen to calculate the argon concentration such that a sum of molar fractions of the oxygen, nitrogen and argon within each of the stage models is equal to 1.0. A common separation adjustment factor is used for the stage models located within each column section defined between locations of the feed and draws to and from each of the higher pressure column, the lower column and argon column. The common separation adjustment factor is calculated such that the difference between the measured oxygen concentrations and the calculated oxygen concentrations at the ends of each column section are minimized.

The controller can be a model predictive controller. Further, the controlling means can be a set of control valves and PID controllers associated with each of the control valves. The PID controllers are connected to the model predictive controller such that the manipulated variables calculated by the model predictive controller are targets for the PID controllers.

In either aspect of the present invention, the controlled variables can comprise the nitrogen concentration in the crude argon feed stream and an argon concentration within the waste nitrogen stream.

BRIEF DESCRIPTION OF THE DRAWINGS

Although the specification concludes with claims distinctly pointing out the subject matter that Applicant regards as his invention, it is believed that the invention will be better understood in connection with the accompanying drawings in which:

DETAILED DESCRIPTION

Figure 1:
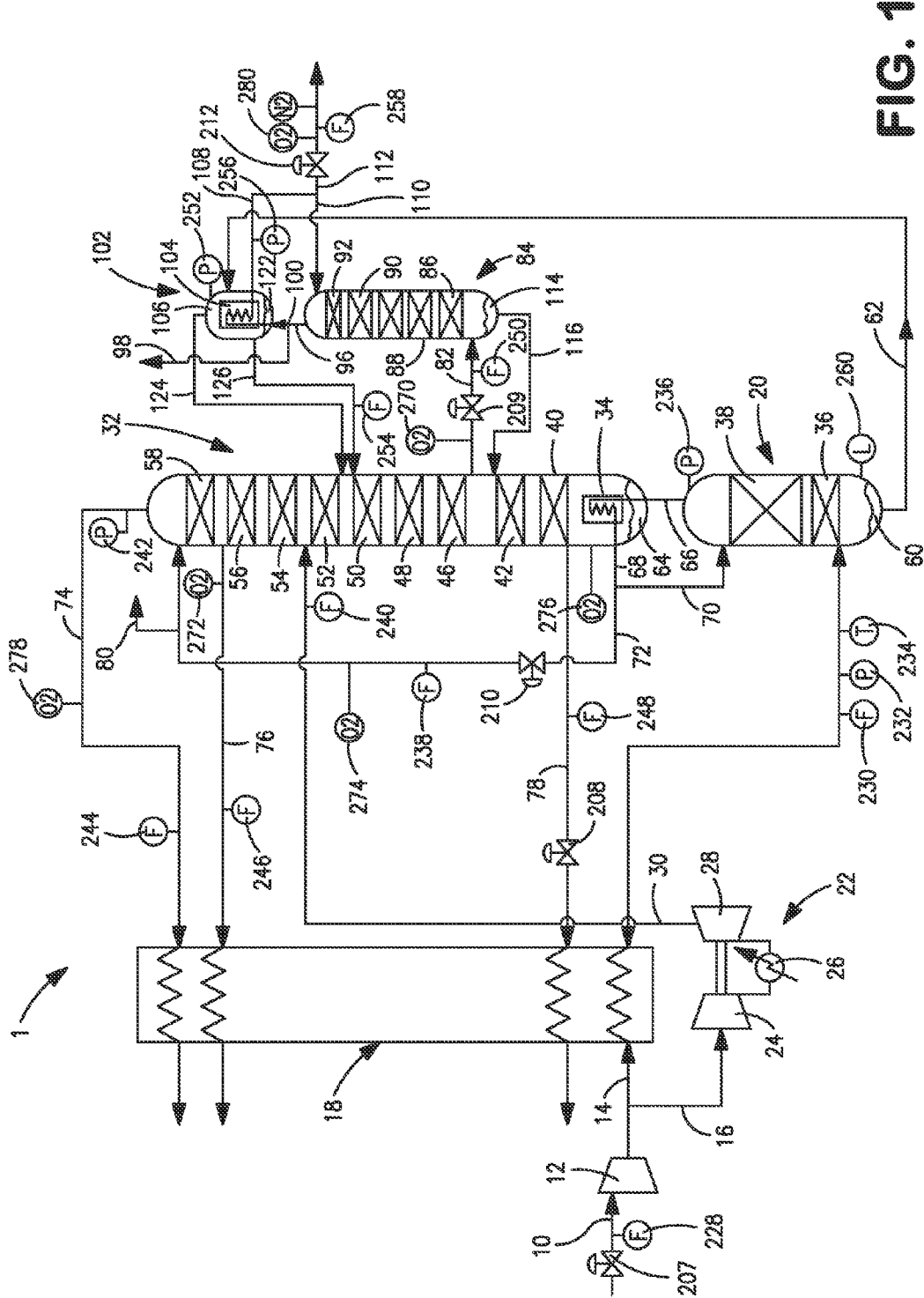
FIG. 1 is a schematic diagram of an air separation plant designed to produce an argon product and that is controlled in accordance with a method of the present invention.

With reference to FIG. 1, an air separation plant 1 is illustrated that is designed to produce an argon product which is discharged from air separation plant 1 as an argon product stream 112. Argon product stream 112 would typically have a purity of about 98 percent and as such, would be a crude argon product in which oxygen and nitrogen would have to be removed by downstream process known in the art. It is understood, however, that air separation plant 1 is illustrated for exemplary purposes only and the present invention is therefore not limited to the illustrated plant. For example, air separation plant 1 could be designed to produce an argon product having oxygen and nitrogen impurities less than 2 ppm. In such case the argon column would be formed of two columns collectively having sufficient stages of separation to produce such a product. The control system of the present invention is not illustrated in FIG. 1 so that the operation of the illustrated air separation plant 1 can be more easily understood. However, such control system is specifically shown in FIGS. 2 and 4 and contains key elements shown in FIG. 1.

In air separation plant 1 an incoming feed air stream 10 is compressed in a main air compressor 12 and then divided into first and second compressed air streams 14 and 16. Although not illustrated, typically, an after-cooler would be provided directly down stream of the main air compressor 12 to remove the heat of compression and a pre-purification unit would be located directly down stream of the after-cooler having adsorbent beds for removing higher boiling contaminants such as moisture, carbon dioxide and hydrocarbons. The first compressed air stream 14 is cooled in a main heat exchanger 18 which typically is constructed of brazed aluminum plate fin construction. Although the main heat exchanger is shown as a single unit, typically, it would be divided into parallel units and further subdivided into warmer and colder heat exchangers. In any case, the first compressed air stream 14 is introduced into the bottom of a higher pressure distillation column 20 and the second compressed air stream 16 is introduced into a turbine loaded booster compressor arrangement 22. Turbine loaded booster compressor arrangement 22 has a booster compressor 24 to further compressed the second compressed air stream 16, an after-cooler 26 to remove the heat of compression and a turboexpander 28 that drives the booster compressor 24 and produces a cold exhaust stream 30. Cold exhaust stream 30 is introduced into a lower pressure column 32 to impart refrigeration into the air separation plant 1.

The higher and lower pressure columns 20 and 32 are so designated in that higher pressure column 20 operates at a higher pressure than the lower pressure column 32. Typically, the higher pressure column 20 operates at 5.5 bara and the lower pressure column 32 operates at a pressure of about 1.25 bara. The higher pressure column 20 is thermally linked by a condenser reboiler 34 that will be discussed hereinafter. The higher pressure column 20 is provided with mass transfer contacting elements 36 and 38 and the lower pressure column 32 is provided with mass transfer contacting elements 42, 44, 46, 48, 50, 52, 54, 56, and 58. All of such elements, as well known in the art can be formed of structured packing, trays and dumped packing or combinations of such elements. Their purpose is to contact ascending vapor phases and descending liquid phases of the particular mixture to be refined in such columns. For example, the introduction of the first compressed air stream 14 into higher pressure column 20 initiates the formation of an ascending vapor phase that becomes ever more rich in nitrogen as its ascends through the mass transfer contacting elements 36 and 38 through contact with a descending liquid phase that becomes richer in oxygen to produce a crude liquid oxygen column bottoms 60. A crude liquid oxygen stream 62 composed of the crude liquid oxygen column bottoms 60 is further refined in the lower pressure column 32 to produce an oxygen-rich liquid column bottoms 64 within the lower pressure column 32.

The resulting distillation in the higher pressure column 20 produces a nitrogen-rich vapor column overhead. A nitrogen-rich vapor stream 66 composed of the nitrogen-rich vapor column overhead is condensed in the condenser reboiler 34 to produce a nitrogen-rich liquid stream 68 that is divided into reflux streams 70 and 72 to reflux the higher and lower pressure columns 20 and 32 and thereby initiate formation of a descending liquid phase in such columns. This condensation is accomplished through indirect heat exchange with the oxygen-rich liquid column bottoms 64 that is partly vaporized to initiate the ascending vapor phase within the lower pressure column 32. A product nitrogen stream 74, a waste nitrogen stream 76 and a product oxygen stream 78 are all removed from the lower pressure column 32 and warmed within the main heat exchanger 18 through indirect heat exchange with the first compressed air stream 14. Part of the reflux stream 72 as can optionally be discharged as a high pressure product nitrogen stream 80. A crude argon feed scream 82 is also removed from the lower pressure column 32 and introduced into an argon column 84 for further refinement and the consequent production of the argon product stream 112.

Argon column 84 is also provided with mass transfer contacting elements 86, 88, 90, 92 and 94 of the type discussed above to conduct a rectification of the crude argon feed stream 82 and thereby produce the argon product stream 112. An argon-rich vapor column overhead is produced within argon column 84 and an argon-rich vapor stream 96, composed of such overhead, is removed that is preferably divided into an argon vent stream 98 and a subsidiary argon-rich vapor stream 100. Argon vent stream 98 is vented to prevent the buildup of nitrogen within argon condenser 102. Subsidiary argon-rich vapor stream 100 is condensed in the argon condenser 102. Argon condenser 102 is provided with a core 104 contained in a shell 106 to produce an argon-rich liquid stream 108 that is divided into an argon-rich liquid reflux stream 110 to the argon column 84 and the argon product stream 112. An oxygen containing liquid column bottoms 114 is produced in the argon column 84 and an oxygen containing stream 116 composed of such column bottoms is returned back to the lower pressure column 32. Crude liquid oxygen stream 62 is introduced directly into the shell 106 of argon condenser 102 to provide the heat exchange duty in argon condenser 102 to condense the subsidiary argon-rich vapor stream 100. The condensation partially vaporizes the second subsidiary crude liquid oxygen stream 120 to produce a sump liquid 122 within shell 106 and a vapor phase. A vapor phase stream 124 composed of the vapor phase is removed from shell 106 and a liquid phase stream 126, composed of sump liquid 122 is also removed from shell 106 and both of such streams are introduced into the lower pressure column 32. In such manner, the crude liquid oxygen stream is introduced into the lower pressure column 32 for further refinement while performing heat exchange duty within the argon condenser 102.

Figure 2:
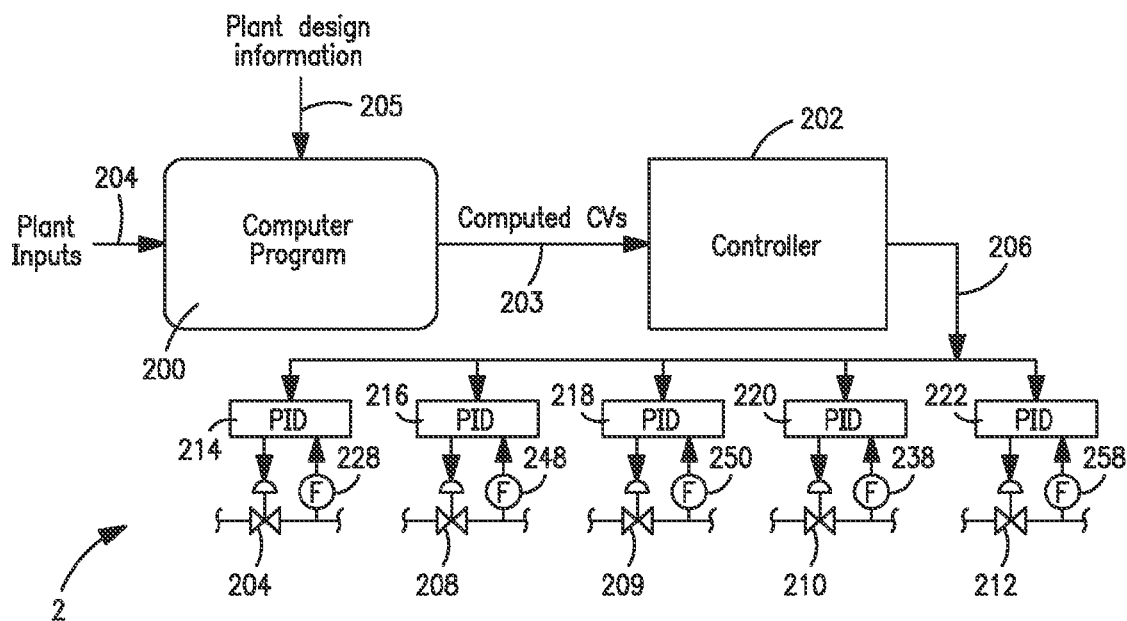
FIG. 2 is a schematic diagram of the control system of the present invention.

Air separation plant 1 is controlled to maximize argon yield in the argon product stream 112 by a control system 2 illustrated in FIG. 2. Control system 2 utilizes a computer program 200 that is connected to a controller 202 which preferably is a model predictive controller. The computer program 200 generates controlled variables ("CV's"), generally shown by arrowhead 203, that are the argon concentration in the waste nitrogen stream 76 and the nitrogen concentration within the crude argon feed stream 82. Inputs to the computer program 200 are various plant measurements of flows, temperature and pressures of some of the streams introduced and drawn from the higher pressure column 20, the lower pressure column 32 and the argon column 84 as well as the oxygen concentration of some of such streams. These inputs are generally shown by arrowhead 204. Additionally, plant design information is also an input as generally indicated by arrowhead 205. In this regard, it is possible that the computer program 200 would be pre-programmed with such plant design information. Inputs 204 and 205 will be more specifically discussed hereinafter. The controller 202 uses the controlled variables 203 to produce manipulated variables, generally shown as arrowhead 206, that will be set such that the controlled variables 203 are in a targeted range that will ensure that the argon recovered in the argon product stream 112 will be optimized for the current operation of air separation plant 1. The targeted range is pre-programmed in the controller. The manipulated variables 206 are, at minimum, a set of flow rates of an air feed stream 10, the product oxygen stream 78 and the crude argon feed stream 82. These manipulated variables are controlled by the inlet guide vanes 207 for the feed air stream 10, a control valve 208 for the product oxygen stream 78 and a control valve 209 for the crude argon feed stream 82. Additionally, other manipulated variables can be controlled, namely the flow rate of the reflux stream 78 which is control by a valve 210 and the flow rate of the product argon stream 112 that is controlled by a valve 212. While the valves 207-212 can be controlled directly by the controller 202, preferably, the valves are controlled by known proportional, integral, differential controllers 214, 216, 218, 220 and 222 that are known as "PID" controllers. The controller 202 sets targets for the flow through each of these valves and the controllers 214-222 provide signals to adjust the openings of these valves and therefore, the related flows as sensed by flow meters 228, 248, 250, 238 and 258, respectively.

As indicated above, controller 202 is a model predictive controller. The use of such controllers is well known in the art and include step response models that are derived by performing step changes in the manipulated variables and observing the response of the plant measurements. The model predictive controller uses these step response models to compute values for the manipulated variables that will maintain the controlled variables within a specified range for stable operation. As an example, such controller could be a DMCPLUS controller that can be obtained from Aspen Technology, Inc. of Burlington, Mass. USA. As could be appreciated, PID control is also possible, but would result in a complex array of controllers. With respect to the targeted nitrogen concentration range in the crude argon feed stream 82, such range is selected on the basis that as nitrogen is increased argon concentration in such stream will also be increased. However, if the nitrogen concentration is increased too much, nitrogen will accumulate at top of argon column 84 and reduce temperature difference across argon condenser 102. This will have the effect of reducing reflux to the argon column 84 because the argon rich vapor stream 96 to be condensed will be colder than the liquid phase crude oxygen stream 62 supplied from the bottom the high pressure column due to the increased presence of the nitrogen. The targeted range of argon concentration in the waste nitrogen stream is targeted such that the argon available to the crude argon feed stream 82 will be maximized. The targeted ranges for the controlled variables would depend on a particular plant design and in any given plant design may change over time. However, in all cases the exact values for such range would be experimentally determined.

In terms of the manipulated variables, a decrease in the flow rate of the feed air stream 10 will also decrease the amount of argon in the waste nitrogen stream 76. However, this will also decrease the amount of nitrogen traffic in lower pressure column 32 to effect an increase liquid to vapor ratio in the lower pressure column and thereby drive increasing the nitrogen concentration within the crude argon feed stream 82. Decreasing the flow rate of the crude argon feed stream 82 will decrease the nitrogen concentration within such stream and vice-versa. An increase in the flow rate of the product oxygen stream will increase nitrogen concentration in the crude argon feed stream 82 and decrease argon concentration in the waste nitrogen stream 76. If the flow rate of the argon product stream 112 is decrease, then oxygen concentration within the argon product stream 112 will also decrease. If the flow rate of the reflux stream 70 is increased, the argon concentration in the waste nitrogen stream 76 will decrease to thereby increase argon recovery or yield.

A yet further possible manipulated variable is to control flow through the turboexpander 28 by control of the speed of turboexpander 28 or nozzle position as well known in the art. An increase in such flow will also increase nitrogen in the crude argon feed stream 82 and decrease the argon concentration in the waste nitrogen stream 76. Other possible control handles are liquid nitrogen addition to the columns or liquid nitrogen draw from the condensed nitrogen stream 68. The addition of liquid nitrogen will decrease the argon concentration in the waste nitrogen stream 76 and increase the nitrogen concentration in the crude argon feed stream 82. An increase in liquid nitrogen product production will increase the argon concentration in the waste nitrogen stream 76 and decrease the argon concentration in the crude argon feed stream 82.

Computer program 200 contains models of the higher pressure column 20, the lower pressure column 32 and the argon column 84 as well as the condenser reboiler 34 and the argon condenser 102. These models incorporate stage models of each stage of separation to be conducted in each of the columns. The stage models and therefore, the overall models of each of the columns can be biased by separation adjustment factors in a manner to be discussed. The condenser reboiler 34 and the argon condenser 102 and their sumps are separately modeled as a single stage models or in other words, separate vapor liquid equilibrium stages.

Figure 3:
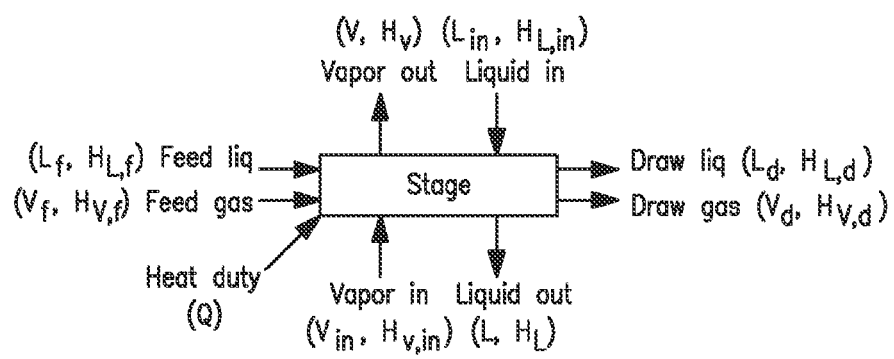
FIG. 3 is a schematic diagram of a single stage of separation that is applicable to any of the columns illustrated in FIG. 1 and that is modeled in accordance with the present invention.

In the models of the columns, each stage of separation is modeled by a stage model that is illustrated in FIG. 3. For each stage model, a dynamic material balance is calculated, a vapor liquid equilibrium correlation is performed, and a steady state energy balance is calculated. Each stage model calculates the stream composition of all external or internal liquid and vapor streams or flows entering or leaving a stage and also, the flow rates, temperature and pressure of such streams. For example, the internal flows between stages are "Vapor in"; "Vapor out"; "Liquid in" and "Liquid out". The external flows, if any, are the "Feed liq"; the "Feed gas"; and "Draw liq" and the "Draw gas" that all arise due to the feeds and draws to a particular column. In this regard, an internal flow of "Liquid out" of a particular stage model can be an external flow to another column and therefore, an external flow to a particular stage model. Each of the columns 20, 32 and 84 has several stages of separation that are determined from calculations, for example, McCabe-Thiele diagrams. Each of the mass transfer contacting elements, for instance mass transfer contacting elements contained in packing sections 36 and 38 of the higher pressure column 20 has several of such stages of separation that are further determined from design information concerning the particular mass transfer contacting elements used and such data constitutes part of the plant design information 205 that serves as an input to computer program 200.

The computation of dynamic material balance, the vapor liquid equilibrium correlation, and the steady state energy balance are all known calculations to one skilled in the art would be used in the design of a distillation column. Starting with the dynamic material balance, The material balance for the liquid phase $i^{th}$ component, for example, "i" could be set equal to 1 for Argon, 2 for oxygen and 3 for nitrogen. The dynamic material balance for each stage can be written as the following equation:

$$\frac{d(M_i)}{dt} = L_f x_{f,i} + L_{in} x_{in,i} + V_f y_{f,i} + V_{in} y_{in,i} - (L_d x_{d,i} + L x_i + V y_i + V_d y_{d,i})$$

where $M_i$ is the molar holdup of the $i^{th}$ component on the stage, the x's are the liquid phase mole fractions and y's are the vapor phase mole fractions. With specific reference to FIG. 3, it is understood that some of the stages have no external feed or draws and consequently, some of the terms in the equation can be 0 for a particular stage. The liquid phase mole fraction of liquid either leaving a stage or as liquid hold-up on the stage is calculated from the following equation:

$$x_i = \frac{M_i}{\sum_{j=1}^{n} M_j}$$

where n is the number of components in the mixture. For example, n=3 for air separation because the calculation are idealized as being for a composition containing nitrogen, oxygen and argon. The subscript "j" represents the number of moles of a particular component and therefore, the particular mole fraction is the number of moles of a particular fraction divided by the total number of moles of all three fractions. The liquid phase dynamic material balance is integrated using a numerical integration scheme (e.g., Euler method) to compute the liquid phase composition and the total holdup of every stage. The integration time interval can be chosen to be 1 second, or another selected time interval that preserves the stability of the numerical integration. The liquid flow, L, leaving a stage and entering a stage below ("Liquid out" and "Liquid in" respectively in FIG. 3) is assumed to be a linear function of the total molar holdup and can be determined from the following equation:

$$L = \alpha \sum_i M_i$$

The proportionality constant $\alpha$ is obtained by measuring the steady-state liquid flow from a column section via a steady-state mass balance or using the steady-stage liquid flow derived from a material balance of the entire three columns system, and dividing it by the expected holdup using the designed height equivalent to a theoretical stage (HETP). If $L_{ss}$ is the steady-state liquid flow down a column section, then $\alpha$ can be obtained from the following equation:

$$\alpha = \frac{L_{ss}}{\rho_{liq} \times A_{column} \times \sum_k HETP_k}$$

where $A_{column}$ is the cross-sectional area of the column section, $\rho_{liq}$ is the molar liquid density, and $HETP_k$ is the height equivalent of a theoretical stage for the $k^{th}$ stage in the column section. These three quantities are the plant design information that also serve as another part of the input to the models that is designated by reference numeral 205. The summation in the above equation is performed over all stages in the column packing or tray section such as 36 and 38. For example, the steady-state liquid flow can be calculated as follows for the argon column 84. The flow of the vapor entering the column is measured by means of flow transducer 250, as discussed below, and the flow of the argon product stream 112 is also measured by means of flow meter 258 to be discussed below. Because the argon condenser 102 refluxes the liquid from the top into the argon column 84 and all of this liquid flows out of the bottom of the Argon column 84, $L_{ss}$ is set equal to the difference between the vapor argon flow into the argon column 84 and the argon product flow out from the argon column 84. The value of α is calculated only once and is fixed for the remainder of the program execution.

Once the liquid phase composition is estimated from the material balance, the vapor phase equilibrium composition can be readily computed using the stage pressure, the liquid composition and vapor-liquid-equilibrium ("VLE") calculations using Raoult's law. The pressure at each stage is computed via linear interpolation between top and bottom pressures in a column and the number of stages are obtained from design information. If pressure is measured only at extremity (e.g., only at the top or bottom) of a column, then the pressure at the other extremity can be computed as:

$$P_{bottom} = P_{top} + \Delta P_{design}$$

Where $\Delta P_{design}$ is the design pressure drop across the column and also constitutes the plant design information that is an input to the program as indicated by arrowhead 205.

The Raoult's law VLE calculation computes vapor phase compositions ($y_i$) from liquid phase compositions ($x_i$) using the following relation $$y_i = x_i \frac{P_i^{sat}}{P}$$

where $P_i^{sat}$ is the saturated vapor pressure of component i by known methods such as the relation:

$$\ln(P_i^{sat}) = A_i + \frac{B_i}{C_i + T}$$

where P is the stage pressure, $A_i$, $B_i$ and $C_i$ are correlation constants and T is the equilibrium absolute temperature The saturated vapor pressure is a function of equilibrium temperature. The equilibrium temperature is calculated by solving for the value that will result in:

$$\sum_{i=1}^{n} y_i = 1$$

In other words, the equilibrium temperature is that temperature where the sum of the mole fractions of the vapor components is equal to 1. The output from the VLE calculations is the vapor phase composition of every component and the equilibrium temperature for that stage.

Once the equilibrium vapor compositions are estimated from the VLE calculations, a separation adjustment factor ("SAF") can be applied for different column sections to adjust the equilibrium composition at every stage so that the difference between the adjusted stage composition at specific stages where oxygen composition is measured and the measured composition is minimized to bias the models. Actual measurements are taken every minute of oxygen content in crude Argon stream 82, waste nitrogen stream 76, the nitrogen reflux stream 72 and the argon product stream 112, the oxygen product stream 78 and the nitrogen product stream 74 and the argon product stream 112 by oxygen concentration sensors, 270, 272, 274, 276, 278 and 280, respectively. This adjustment of the vapor phase composition is presented in the following equations:

$$y_{N_2} = y^*_{N_2}$$

$$y_{O_2} = E_{O_2}(y^*_{O_2} - y_{O_2,ref2}) + y_{O_2,ref2}$$

$$y_{Ar} = 1 - y_{N2} - u_{O2}$$

where the y* are the equilibrium compositions computed using the VLE relations and $E_{O2}$ is the specified or computed SAF for the column section that is defined between points at which feeds enter a particular column and draws leave a particular column; "$y_{O2}$" is the adjusted vapor phase composition for the oxygen that has been adjusted by the SAF. Since "$y_{N2}$" is equal to the computed equilibrium composition for the nitrogen component, as is apparent from the equations, the argon concentration is selected such that a sum of the molar component fractions is equal to 1.0. In any case in such manner each of the stage models is biased and when assembled into the models, the assembled models for the columns are thereby biased.

An example of such calculation for the lower pressure column 32, five column sections exist that respectively encompass mass transfer contacting elements 40, 42; 46, 48, 50; 52; 54, 56; and 58. The composition $y_{ref2}$ is a reference composition. For example, the SAF for the bottom section of the lower pressure column 32 (elements 40, 42) can be calculated as:

$$E_{O_2} = \frac{y_{O_2,CAD} - y_{O_2,GO2}}{y^*_{O_2,CAD} - y_{O_2,GO2}}$$

where for this case $y_{ref2} = y_{GO2}$ (oxygen composition of product oxygen stream 78 as measured by oxygen concentration sensor 276.), $y_{O2,CAD}$ is the crude Argon stream oxygen composition as measured by oxygen sensor 270 and $y^*_{O2,CAD}$ is the equilibrium oxygen composition at the crude Argon draw stage as computed above. The separation factor is also computed for other sections, for example, the sections 46, 48, 50; 52; and 54, 56. However, for these sections the measured oxygen concentrations that are used are those of oxygen sensor 270 (crude argon feed stream 82) and 272 (the waste nitrogen stream 76) and for section 58, oxygen sensor 278 (nitrogen product stream 74). For the higher pressure column 20, the oxygen concentration that is used is one assumed for air and another an actual measurement by oxygen sensor 274. For the argon column, oxygen measurements are taken by oxygen sensors 270 and 280. This biasing of models is preferable in that it helps ensure accurate results of the models. However, embodiments of the present invention are possible in which no such biasing is conducted or alternatively, a SAF is computed for a single stage model in a column and the same SAF is commonly applied throughout the column. A yet further alternative is to arbitrarily set an SAF and have the program perform iterations in which the set SAF is increased and decreased until the difference between the computed and measured oxygen concentrations is within a specified tolerance. The resulting SAF would then be used in the calculations.

After computing the liquid and vapor phase compositions, the steady stage energy balance is computed in which the enthalpies of each of the streams entering and leaving each stage can be computed using empirical correlations. The enthalpies are used to compute the vapor flow leaving the stage using a steady-state heat balance presented in the following equation:

$$V = V_{in}\frac{(H_{V,in} - H_L)}{(H_V - H_L)} + L_{in}\frac{(H_{L,in} - H_L)}{(H_V - H_L)} + L_f\frac{(H_{L,f} - H_L)}{(H_V - H_L)} - L_d + V_f\frac{(H_{V,f} - H_L)}{(H_V - H_L)} - V_d + \frac{Q}{(H_V - H_L)}$$

As an illustration of the described approach, consider the stage at which the waste nitrogen stream 76 is drawn from the lower pressure column 32. For this stage, $L_f = 0$
$V_f = 0$
$Q = 0$
$L_d = 0$
$V_d = F_{WN_2}$ The $L_{in}$ and $V_{in}$ flows used in the dynamic material balance equation set forth above are liquid and vapor flows coming from the stage above where the waste nitrogen stream 76 drawn and below such draw point, respectively. The composition of the waste nitrogen stream 76 is the same as the stage vapor composition determined from the VLE calculation of the stage from which the waste nitrogen stream 76 is drawn. The oxygen concentration measurement of waste nitrogen stream 76 is then used to compute the separation adjustment factor. The separation adjustment factor is then varied to minimize the difference between the computed oxygen concentration and the calculated oxygen concentration of such stage. The same calculation is done for other column sections of the column system.

The condenser reboiler 34 is a heat exchanger that exchanges heat between the top of higher pressure column 20 and the sump of the lower pressure column 32. Use of predetermined correlations to compute $V_{boilup}$ while possible tends to destabilize the simulation because even small errors result in instability of the computed oxygen fraction at the bottom of the low-pressure column. Thus, the vapor boilup flow to stabilize and match the computed oxygen fraction at this stage is used. The actual calculation of flow uses a proportional integral control model to estimate the vapor boilup, where the setpoint for the control model is the measured oxygen composition of this stage, the output of the control model is the vapor boilup flow and the process output is the computed oxygen composition of the stage. The proportional integral control model attempts to manipulate/estimate the vapor boilup rate to match the measured oxygen composition. This approach stabilizes the computational scheme and produces accurate results. Such a control scheme requires the specification of tuning parameter that would be applied to the proportional and integral terms of such a method in a manner well known in the art.

For the higher pressure column 20, the change in the sump level is converted to a change in holdup by multiplying the change in sump level by the cross-sectional area of the high pressure column and the liquid density obtained by either a look-up physical property table or through known computation or correlation. The liquid flow leaving the sump, in other words, the crude liquid oxygen stream 62, is computed by the dynamic material balance set forth in the following equation:

$$L = V - \frac{dM}{dt} + L_{in}$$

where $L_{in}$ is the flow from the stage above the high-pressure column sump. For simplification, the vapor flow V in this equation can be assumed to be zero. It is understood that a flow meter could be used in lieu of such calculation to obtain the flow of the crude liquid oxygen stream 62. Then the dynamic material balance equation for all other stages, $$\frac{d(M_i)}{dt} = L_f x_{f,i} + L_{in} x_{in,i} + V_f y_{f,i} + V_{in} y_{in,i} - (L_d x_{d,i} + L x_i + V y_i + V_d y_{d,i})$$

is used to compute the molar composition of the liquid phase and the VLE calculation are used to compute the equilibrium vapor phase compositions.

The models of the stages can then be assembled to produce models of each of the higher pressure column 20, the lower pressure column 32 and the argon column 84 by using computed, and where applicable, actual compositions of liquid and vapor streams entering and leaving each stage. The stage models within each column are linked or connected together because the liquid that is introduced into a stage model ("Liquid in") is that liquid flow calculated from the next overlying stage model ("Liquid out") and the vapor flow introduced in a stage model ("Vapor in") is the vapor flow calculated by an underlying stage model ("Vapor out"). Further, the models incorporating the stage models are further linked by reason that the liquid and vapor flow from a stage model in a particular column ("Draw liq" and "Draw gas") can be the flow fed to the stage model of another column ("Feed liq" and "Feed gas").

As is apparent from the above discussion the modeling employed in connection with the present invention will compute vapor and liquid compositions in each stage of separation along with equilibrium temperature. While the present invention contemplates that the controlled variables are the nitrogen concentration in the crude argon feed stream 82 and the argon concentration within the waste nitrogen stream 76, given the granularity of the calculations, an embodiment of the present invention is possible in which only the controlled variables constitute only the nitrogen concentration within the crude argon feed stream 82. Additionally, there are other quantities that are computed by the stage models that will be referable to or have a direct bearing on the actual nitrogen concentration within the crude argon feed stream 82. Consequently, in place of a calculation of the nitrogen concentration within the crude argon feed stream 82 it is equally possible to calculate controlled variables that can be computed as combinations of the quantities computed through the rigorous stage models such as calculating an argon bubble shape in the low pressure column. An example of this controlled variable is:

$$CV_{Arbubble} = \frac{\sum_{k=1}^{no.\ of\ stages} |k - CAD_{stage}|}{\sum_{k=1}^{no.\ of\ stages} y_{Ar,k} \times |k - CAD_{stage}|}$$

where the summation is performed over all the stages in the low-pressure column, k is the stage number, $CAD_{stage}$ is the stage number of crude-argon draw stream and $y_{Ar,k}$ is the vapor phase molar fraction of the $k^{th}$ stage in the low-pressure column.

While in a possible embodiment of the present invention, it is possible to directly measure flows, temperature and pressure of the feeds and draws into and from the higher pressure column 20, the lower pressure column 32 and the argon column 84, this would lead to an expensive array of sensors. Therefore, in the illustrated embodiment, some of these quantities are directly measured and others are derived from the stage models described above and yet others are estimated.

Turning first to the higher pressure column 20, the flow rate, pressure and temperature of the first compressed air stream 14 before entry into the higher pressure column are directly measured by means of flow meter 230, pressure transducer 232 and temperature transducer 234. The temperature of nitrogen reflux stream 70 is estimated by calculating the temperature of the top stage of the higher pressure column 20 with the use of the assembled stage models. The pressure at the top of the higher pressure column 20 is measured by a pressure transducer 236. The composition of the vapor at the top stage of the higher pressure column 20 is also an output of the assembled stage models. This information is used in a dew temperature calculation to estimate the temperature of the condensing vapor and therefore the temperature of the nitrogen reflux stream 70. The pressure of the nitrogen reflux stream 70 is assumed to be 1 psi above the pressure measured by pressure transducer 236. The flow rate of the nitrogen reflux stream 70 is calculated via a material balance in which such flow is assume equal to the nitrogen-rich vapor stream 66 less the flow rate of the nitrogen reflux stream 72 that is measured by a flow meter 238. The flow rate of the nitrogen-rich vapor stream 66 is computed by the assembled stage models as the vapor flow leaving the top stage of the higher pressure column 20. The temperature of the nitrogen-rich vapor stream 66 is computed from the assembled stage models as the temperature of the separation stage of the higher pressure column 20. The pressure of the nitrogen-rich vapor stream 66 is that pressure measured by pressure transducer 236. The flow rate, temperature and pressure of the crude liquid oxygen stream is calculated by dynamic material balance for the bottom stage of the high-pressure column.

Turning to the lower pressure column 32, the flow rate of the exhaust stream 30 of the turboexpander 28 is measured by flow meter 240. The pressure at the stage where the exhaust stream 30 enters the lower pressure column 32 is calculated by measuring the pressure at the top of the lower pressure column 32 by a pressure transducer 240 and then determine the pressure at the stage where exhaust stream 30 enters by using the design pressure drop of the mass transfer contacting elements 40-58 in the lower pressure column to compute such pressure. The pressure of the exhaust stream is then assumed to be 2 psi above the such stage pressure where the exhaust stream 30 enters the lower pressure column. Using this assumed pressure, the known composition of air, and a dew temperature calculation, the temperature of the exhaust stream 30 can be calculated.

The temperature of the liquid nitrogen reflux stream 72 is calculated by assuming that such stream enters at a pressure 2 psi higher than the corresponding stage pressure and is a saturated liquid at that pressure. A bubble temperature calculation can then be used to compute the temperature. The pressure of liquid nitrogen reflux stream 72 is the assumed entry pressure given above and the flow rate is measured by the flow meter 238. The temperature of the product nitrogen stream 74 is computed using the assembled stage models as the temperature of the top stage of the lower pressure column 32. The flow rate of the product nitrogen stream 74 is computed using the assembled stage models as the vapor flow leaving the top stage of the lower pressure column 32. This flow rate may also be measured by a flow meter 244. The pressure of the product nitrogen stream 242 is known from actual measurement provided by pressure transducer 242. The temperature of the waste nitrogen stream 76 is computed using the assembled stage models as the temperature of the stage where the waste nitrogen stream 76 is drawn. The pressure of the waste nitrogen stream 76 is computed using linear interpolation as described above as the pressure of the stage where the waste nitrogen stream 76 is drawn. The flow rate of the waste nitrogen stream 76 is measured by means of a flow meter 246.

The flow rate of the oxygen product stream 78 is measured using the flowmeter 248 and the temperature of such stream is computed by the assembled stage models as the temperature of the main condenser stage. The pressure of the oxygen product stream 78 can be either measured at the bottom of the lower pressure column 32 or can be computed by adding the design pressure drop to the measured top pressure of the lower pressure column 32.

The temperature of the crude argon feed stream 82 is computed using the assembled stage models as the temperature of the stage at which the crude argon stream is drawn from the lower pressure column 32. The pressure of such stream can either be measured or computed via linear interpolation using the top pressure that is measured for the lower pressure column. The flow rate is measured by a flow meter 250. The temperature of the oxygen containing liquid stream 116 drawn from the argon column 84 is computed via rigorous models as the temperature of the bottom stage of the argon column 84. The pressure of the oxygen containing liquid stream 116 is assumed to be equal to the pressure at the stage where this stream enters the lower pressure column 32 as computed above and the flow rate of such stream is computed through the assembled stage models of the argon column 84 and as the flow of liquid leaving the bottom stage of the argon column 84.

The temperature of the vapor phase stream 124 removed from the argon condenser 102 is computed with the use of the assembled stage models as the temperature of the argon condenser stage and the flow rate is computed using the assembled stage models as the vapor flow leaving the argon condenser stage. The pressure is measured by a pressure transducer 252. The temperature of the liquid phase stream 126 is assumed to be equal to that of the vapor phase stream 124 and the pressure of such stream is assumed to be equal to a sum of the pressure measured by the pressure transducer 252 and the physical pressure head between the bottom of the argon condenser and the physical entry point into the lower pressure column 32 or in other words, the elevation information, from plant design data, of the argon condenser 102 relative to the point of entry into the lower pressure column 32 is used for such computation. The flow rate of the liquid phase stream 126 is measured by flow meter 254. The pressure of the condensed argon stream 108 is measured by a pressure transducer 256 and such pressure would be the pressure of the argon reflux stream 110 and the argon product stream 112. The flow rate of the argon reflux stream 110 is computed by calculating the difference between the vapor flow from the top stage of the Argon column and the measured Argon product draw flow. The flow rate of the argon product stream 112 is measured by a flow meter 258. The temperature of both of such streams is computed using the assembled stage models as the temperature of the condensing vapor in the argon condenser 102.

The sump levels in the higher pressure column 20 is measured by means of a level detectors 260. The measured sump levels in the high-pressure column 20 is used to compute flow rate of the crude oxygen liquid oxygen stream 62 in a manner set forth above.

Figure 4:
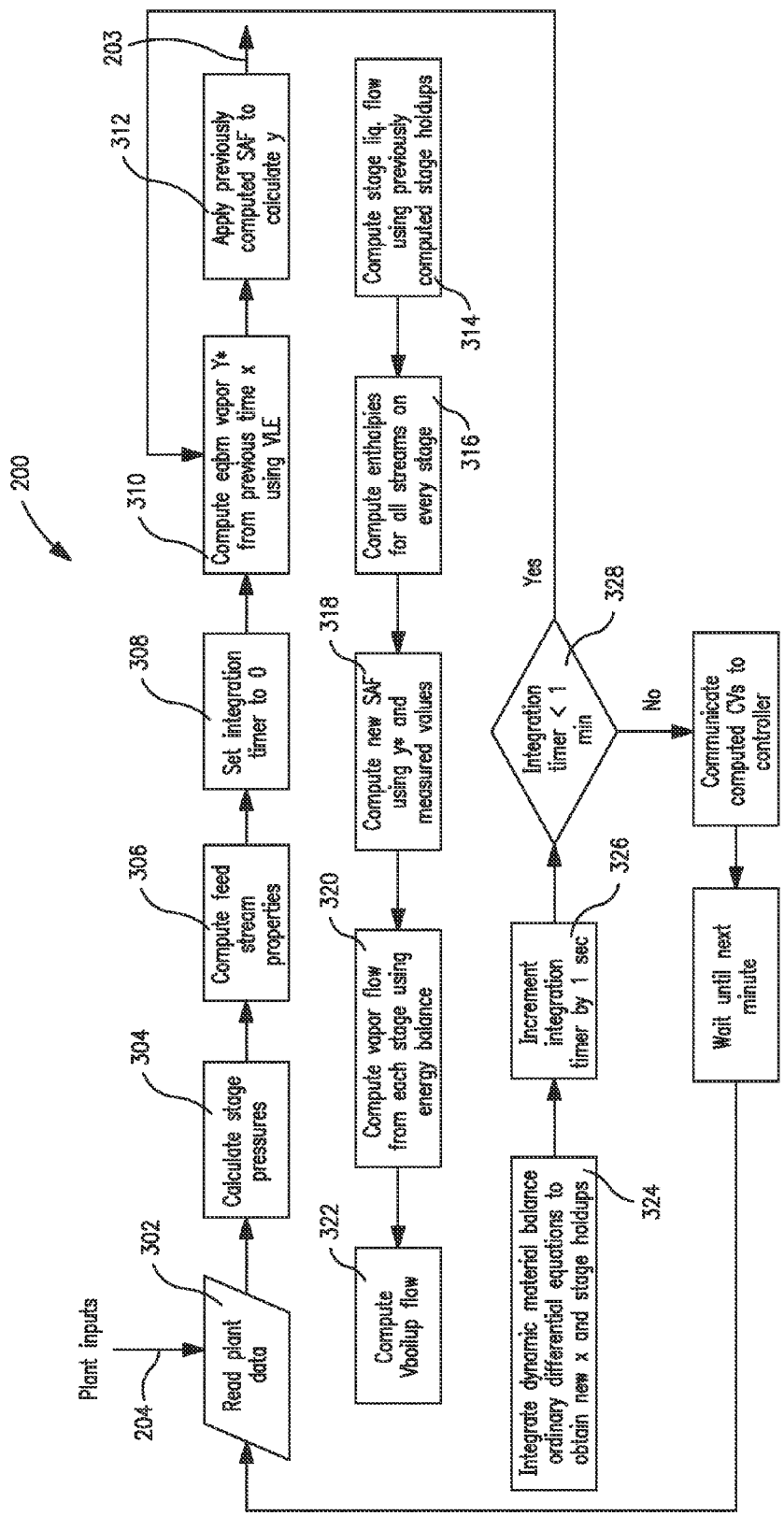
FIG. 4 is a logic flow diagram of a computer program that is used in the control system shown in FIG. 2 and used in connection with the air separation plant shown in FIG. 1 to optimize production of the argon product.

With additional reference to FIG. 4, a logic flow diagram for the computer program 200 is illustrated. Preferably, computer program executes every 60 seconds. As illustrated, at each execution, as shown in block 302, the computer program 200 reads measured, pressure, temperature and flow rates as well as oxygen concentration from the various transducers described above and as generally indicated by arrowhead 204. Data referable to these measured quantities is remotely transmitted as in input to the computer program 200, for example, wirelessly or through data transmission lines that have not be shown for the sake of simplicity. An intermediate step in such data transmission can be to record the data on a disk, computer memory for later retrieval. This data is passed on to the calculation 304 that computes pressure values for every stage as described above. The next block 306 uses the sensor measurements to compute the pressure and temperature of streams entering the columns such as those of stream 30 in the manner described above.

After block 306, an integration timer is set to zero in block 308. This timer keeps track of the integration time steps which can be, for example, 1 second. The equilibrium vapor phase composition "y*" and temperature at every stage is computed in block 310 using the liquid phase composition from the previous time step and the vapor liquid equilibrium computations described previously. The separation adjustment factor is then computed for each column section from the previous time-step and is applied to the equilibrium vapor composition in block 312 to compute the adjusted vapor compositions "y" for every stage. At this point, the controlled variables, namely, the argon concentration in the waste nitrogen stream 76 and the nitrogen concentration within the crude argon feed stream 82 are calculated.

The liquid flow from every stage is then computed in block 314 using the molar liquid holdup computed at the previous time step. The enthalpies for all the streams entering and leaving every stage are computed in block 316 using physical property correlations, and the new SAFs for the column sections are computed using the method described above in block 318. The vapor flow from each stage is computed in block 320 using energy balance equations described above. In block 322, the vapor boilup from the low-pressure column sump is computed using the proportional integral control method. In block 424, all these computed variables are used in the mathematical integration of dynamic material balance ordinary differential equation by one time-step for every stage. The result of one-time step integration of block 324 is the computation of new liquid molar holdups for every stage and new liquid phase compositions for every stage. The integration timer is then incremented by one time step (e.g., 1 second) in block 326. Block 328 checks if the integration timer has reached 1 minute or 60 seconds. If the integration timer is less than 1 minute, then blocks 310 through 328 are repeated until the integration timer is at least equal to 1 minute.

Once the integration timer is at least equal to 1 minute, the computed controlled variables from block 312 are fed as in an input indicated by arrowhead 203 into the controller 202 via either a memory block or database block that are accessible by the controller 202. The computer program then waits until the next minute to start its computations with block 302 and the sequence is repeated again.

While the present invention has been described with reference to a preferred embodiment, as will occur to those skilled in the art, numerous changes, additions and omissions can be made without departing from the spirit and scope of the present invention as set forth in the appended claims.

We claim:

1. A method of controlling an air separation plant to optimize production of an argon product, said method comprising:

continually executing a computer program programmed with models of each of a higher pressure column, a lower pressure column, an argon column, a condenser reboiler operatively associated with the higher pressure column and the lower pressure column and an argon reflux condenser connected to the argon column, the higher pressure column, the lower pressure column, the argon column, the condenser reboiler and the argon reflux condenser constituting components of the air separation plant;

the models containing stage models of each stage of separation within each of the higher pressure column, the lower pressure column and the argon column, the condenser reboiler and the argon reflux condenser each consisting of a single stage model;

the stage models connected to each other by internal vapor and liquid flows between the stage models and the models containing the stage models connected to each other by external vapor and liquid flows to and from the stage models that are situated at locations of feeds and draws to and from each of the higher pressure column, the lower pressure column and the argon column;

during each execution of the computer program:

calculating current values of controlled variables in response to manipulated variables by conducting a dynamic material balance, a vapor-liquid equilibrium calculation and an energy balance calculation for the stage models with the use of the internal and external vapor and liquid flows, the controlled variables comprising a nitrogen concentration within a crude argon feed stream fed from the lower pressure column to the argon column and an argon concentration within a waste nitrogen stream withdrawn from the lower pressure column and the manipulated variables comprising a set of flow rates of an air feed stream to the air separation plant, a product oxygen stream removed from the lower pressure column and the crude argon feed stream; and inputting the current values of the controlled variables calculated by the models into a controller and calculating, within the controller, the manipulated variables from the current values of the controlled variables that will result in the controlled variables having concentration values within targeted ranges, preset in the controller, that will maximize argon product yield of the argon product; and controlling the manipulated variables within the air separation plant to have the set of flow rates calculated by the controller.

2. The method of claim 1, wherein:
the models are configured to calculate oxygen concentrations of process streams and are able to be biased to minimize differences between the oxygen concentrations that are calculated by the models and measurements of the oxygen concentrations within the air separation plant such that accuracy of the calculation of the current values of the controlled variables is assured;
the process streams comprise a product oxygen stream and the waste nitrogen stream withdrawn from the lower pressure column, a nitrogen reflux stream fed to the lower pressure column, the crude argon feed stream fed from the lower pressure column to the argon column and the argon product contained in an argon product stream produced by the argon column; and
during each execution of the computer program the models are biased to minimize the differences between measured and calculated oxygen concentrations of the process streams.

3. The method of claim 2, wherein:
the vapor liquid equibrium calculation calculates equilibrium vapor phase composition within each stage model;
after the equilibrium vapor phase composition is calculated, the models are biased by multiplying a vapor phase concentration of oxygen determined from the equilibrium vapor phase composition by a separation adjustment factor to produce an adjusted vapor phase concentration of the oxygen and then a nitrogen concentration also determined from the equibrium vapor phase composition is used with the adjusted vapor phase concentration of the oxygen to calculate the argon concentration such that a sum of molar fractions of the oxygen, nitrogen and argon within each of the stage models is equal to 1.0;
a common separation adjustment factor is used for the stage models located within each column section defined between locations of the feed and draws to and from each of the higher pressure column, the lower pressure column and argon column; and
the common separation adjustment factor is calculated such that the difference between the measured oxygen concentrations and the calculated oxygen concentrations at the ends of each column section are minimized.

4. A control system for controlling an air separation plant to optimize production of an argon product, said control system comprising:
a computer program programmed with models of each of a higher pressure column, a lower pressure column, an argon column, a condenser reboiler operatively associated with the higher pressure column and the lower pressure column and an argon reflux condenser connected to the argon column, the higher pressure column, the lower pressure column, the argon column, the condenser reboiler and the argon reflux, condenser constituting components of the air separation plant;
the models containing stage models of each stage of separation within each of the higher pressure column, the lower pressure column and the argon column, the condenser reboiler and the argon reflux condenser each consisting of a single stage model;
the stage models connected to each other by internal vapor and liquid flows between the stage models and the models containing the stage models connected to each other by external vapor and liquid flows to and from the stage models that are situated at locations of feeds and draws to and from each of the higher pressure column, the lower pressure column and the argon column;
the computer program configured such that during each execution of the computer program current values of controlled variables are calculated in response to manipulated variables by conducting a dynamic material balance, a vapor-liquid equilibrium calculation and an energy balance calculation for the stage models with the use of the internal and external vapor and liquid flows, the controlled variables comprising a nitrogen concentration within a crude argon feed stream fed from the lower pressure column to the argon column and an argon concentration within a waste nitrogen stream withdrawn from the lower pressure column and the manipulated variables comprising a set of flow rates of an air feed stream to the air separation plant, a product oxygen stream removed from the lower pressure column and the crude argon feed stream;
a controller, having as an input, the current values of the controlled variables calculated by the models and the controller configured to calculate the manipulated variables from the current values of the controlled variables that will result in the controlled variables having concentration values within targeted ranges, preset in the controller, that will maximize argon product yield of the argon product; and
means for controlling the manipulated variables within the air separation plant to have the set of flow rates calculated by the controller.

5. The control system of claim 4, wherein:
the computer program is also responsive to oxygen concentrations of process streams that are measured within the air separation plant and the models are configured to calculate oxygen concentrations of process streams and are able to be biased to minimize differences between the oxygen concentrations that are calculated by the models and measurements of the oxygen concentrations within the air separation plant such that accuracy of the calculation of the current values of the controlled variables is assured; and
the process streams comprising a product oxygen stream and the waste nitrogen stream withdrawn from the lower pressure column, a nitrogen reflux stream fed to the lower pressure column, the crude argon feed stream fed from the lower pressure column to the argon column and the argon product contained in an argon product stream produced by the argon column; and
the computer program is configured such that during each execution thereof, the models are biased to minimize the differences between the measured and calculated oxygen concentrations of the process streams.

6. The system of claim 5, wherein the computer program is programmed such that:
the vapor liquid equibrium calculation calculates equilibrium vapor phase composition within each stage model;
after the equilibrium vapor phase composition is calculated, the models are biased by multiplying a vapor phase concentration of oxygen determined from the equilibrium vapor phase composition by a separation adjustment factor to produce an adjusted vapor phase concentration of the oxygen and then a nitrogen concentration also determined from the equibrium vapor phase composition is used with the adjusted vapor phase concentration of the oxygen to calculate the argon concentration such that a sum of molar fractions of the oxygen, nitrogen and argon within each of the stage models is equal to 1.0;
a common separation adjustment factor is used for the stage models located within each column section defined between locations of the feed and draws to and from each of the higher pressure column, the lower pressure column and argon column; and the common separation adjustment factor is calculated such that the difference between the measured oxygen concentrations and the calculated oxygen concentrations at the ends of each column section are minimized.

7. The system of claim 4, wherein the controller is a mode predictive controller.

8. The system of claim 7, wherein:

the controlling means are a set of control valves and PID controllers associated with each of the control valves; and the PID controllers are connected to the model predictive controller such that the manipulated variables calculated by the model predictive controller are targets for the PID controllers.

* * * * *